Patented July 31, 1923.

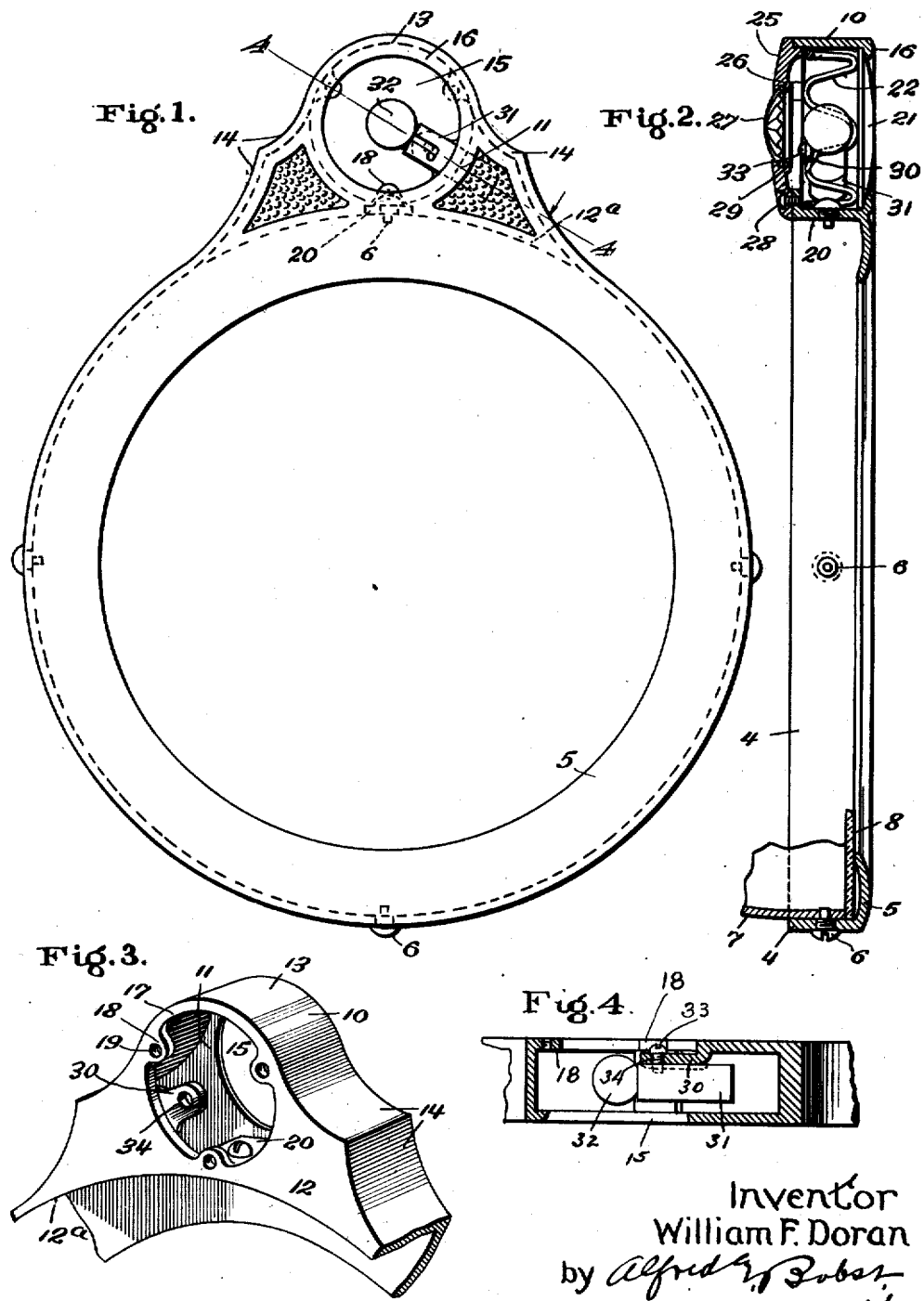

1,463,525

UNITED STATES PATENT OFFICE.

WILLIAM F. DORAN, OF PHILADELPHIA, PENNSYLVANIA.

HEADLIGHT.

Application filed February 21, 1922. Serial No. 538,316.

*To all whom it may concern:*

Be it known that I, WILLIAM F. DORAN, a citizen of the United States, residing at Philadelphia, in the county of Philadelphia, State of Pennsylvania, have invented certain new and useful Improvements in Headlights, of which the following is a specification.

The present invention relates to headlights such as are used on automobiles. Usually the headlights furnished on an automobile comprise a single casing containing a reflector and a lens held over the front of the casing by a rim or frame, which is readily removable to give access to the lamp. It is often desirable from the standpoint of both utility and appearance to provide in addition to the regular headlights small lights located directly adjacent them which may serve as parking lights or as running lights for use on city streets which are well lighted at night by street lights.

The primary object of my invention is to provide an improved structure and arrangement whereby an ordinary headlight may be converted into a headlight of the type having a main larger headlight and a smaller parking light directly adjacent it; or in other words to provide an improved arrangement whereby a small parking light may be attached to or made to form a part of an ordinary headlight so as to convert it into a headlight structure of the type comprising a main headlight and an adjacent smaller parking light.

A further object of my invention is to provide an arrangement which enables the ordinary headlight to be converted at a low cost into one embodying a parking light and without employing the services of a skilled workman.

A further object of my invention is to provide an arrangement wherein the additional smaller light will be firmly attached to the main light so there will be no parts to rattle or come loose.

For a consideration of what I believe to be novel and my invention, attention is directed to the following description and the claims appended thereto.

In the drawing, Fig. 1 is a front or face view of a structure embodying my invention; Fig. 2 is a vertical sectional view of Fig. 1, the rim being shown attached to a headlight casing; Fig. 3 is a detail perspective view of certain parts looking at the structure from the rear, and Fig. 4 is a detail, sectional view taken on line 4—4, Fig. 1.

In carrying out my invention I provide a rim comprising a ring 4 which encircles the headlight casing and has an inturned flange 5 for holding the lens in place. This rim replaces the rim originally provided with the headlight and is provided with a fastening of the same type as the rim it is intended to replace. In the present instance, the fastening means is shown as comprising four screws 6 the ends of which enter openings in the headlight casing. In Fig. 2 the headlight casing is indicated at 7 and the lens at 8.

At one part of ring 4, for example, at what may be considered its top, I form integral with it, walls which define a small light casing preferably open at both the front and rear so it may have a clear lens in front and a colored lens, as a ruby lens in the rear. The small light casing comprises a surrounding or side wall 10, a front wall 11 and a rear wall 12. The surrounding or side wall 10 is formed integral with ring 4 and has a round part 13 which merges into two angularly extending side portions 14 which in turn join ring 4, the walls being given a suitable contour so they present a pleasing appearance. Preferably the portion of ring 4 between the points where side portions 14 merge into it is omitted so that viewed from one aspect it may be considered that side wall 10 is formed by an outwardly projecting portion of ring 4.

Front wall 11 is formed integral with wall 10 and ring 4 and provides or defines a round opening 15 in the front of the light casing. Adjacent rounded part 13 of the light casing, wall 11 is in substance a flange which is indicated at 16. The front wall may be suitably shaped and embossed as shown to give it a pleasing and distinctive appearance. Rear wall 12 also is formed integral with surrounding or side wall 10 and is shaped to define with rounded part 13 of wall 10 a round opening 17. Projecting inwardly from the edge of opening 17 are a plurality of lugs 18 provided with tapped openings 19. Extending transversely from front wall 11 to rear wall 12 is a bridge 20 which carries one of the screws 6, the bridge being located on the circle of ring 4. In other words, it may be considered a small section of ring 4. The inner edge of wall 12 is curved as indicated at 12ª to conform to the inner edge of ring 4.

Front opening 15 is closed by a lens 21 which will be usually of clear glass. It is held in place by an annular reversely bent spring member 22 which follows the contour of wall 13 and is held against the rim of lens 21 by the screw lugs 18 against which the elbows of the bends rest.

Rear opening 17 is closed by a cover plate 25 having an opening 26 at its center in which is a lens 27 which will be usually a ruby glass. Cover plate 25 is held in place by screws 28 which extend through holes in it and thread into tapped openings 19. Lens 27 may be fastened over opening 26 in any suitable manner being shown in the present instance as held by an inturned flange 29.

Formed integral with rear wall 12 is a bracket 30 which projects inwardly toward the center of the casing and is adapted to have fastened to it a lamp socket 31 for carrying a lamp 32. Bracket 30 is curved to conform to the contour of lamp socket 31 and the latter is fastened to it by a screw 33 which extends through a hole 34 in the bracket and threads into a tapped opening in the lamp socket. The bracket is of sufficient size to provide a good seat for the lamp socket. The lamp socket extends at an angle to the vertical, its one end projecting into the space between walls 11 and 12, and it is positioned so as to locate lamp 32 at the center of the openings 15 and 26.

A convolution of spring member 22 lies behind socket 31 which serves to hold the spring member from turning out from behind lugs 18. The socket thus serves to lock the spring member in place. This arrangement of spring holding means for lens 21 is a simple one which can be provided at a low cost and readily assembled into position. At the same time it holds the lens firmly in position.

In use, when it is desired to convert an ordinary headlight into one embodying an additional smaller light, the usual rim is removed and replaced by the rim and headlight structure of my invention. The ring 4 and flange 5 take the place of the rim which has been removed and serve to hold the lens 8 in place and there is then provided adjacent the main headlight a smaller parking light the socket of which may be suitably wired as desired. Usually wires will extend from it to a suitable switch adjacent the driver's seat so the light may be turned on and off at will. Obviously the parking light when installed may be placed above, below or at one side of the main headlight as found desirable. While I have particularly described my invention for use in replacing the ordinary rim of a headlight, it will be understood that it is not necessarily limited to use in this way but may be used as original equipment on a headlight casing.

The structure may be made in various styles and sizes to adapt it to different types and sizes of headlights and the fastening means may be modified accordingly.

It will be noted that the additional headlight casing provided with the rim is small and compact and since it is formed integral with the rim there are no parts to rattle or come loose. The casing is preferably made no wider that the surrounding ring 4 of the rim and this may be about the width of that of the replaced rim. The entire structure is simple to build comprising primarily only a single unitary element which may be formed as a single casting. Also there is little machine work and the matter of assembling the structure is simple. This means that the manufacturing cost is low.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means such as come within the scope of the appended claims.

What I claim as new and desire to secure by Letters Patent of the United States, is:—

1. As an article of manufacture, a rim adapted to replace the ordinary rim of a headlight, a small headlight casing formed integral with said rim and arranged outside it with its walls merging into the rim, end walls for said casing, and a lens in one of said end walls.

2. A structure adapted to replace the rim of a headlight, said structure comprising a ring and a flange, a small headlight casing formed integral with the ring and arranged outside it with its walls merging into the ring, and front and rear walls for said small headlight casing.

3. As an article of manufacture, a structure adapted to replace the rim of a headlight, said structure comprising a ring and a headlight casing formed integral with the ring, said casing comprising a surrounding wall which merges into the ring and front and rear walls formed integral therewith.

4. As an article of manufacture, a structure adapted to replace the rim of a headlight, said structure comprising a ring and a headlight casing formed integral with the ring, said casing comprising a surrounding wall which merges into the ring, a front wall and a rear wall formed integral therewith, said front wall having an opening, a lens over said opening, and a bracket for supporting a lamp in the casing.

5. As an article of manufacture, a structure adapted to replace the rim of a headlight, said structure comprising a ring and a headlight casing formed integral with the ring, said casing comprising a surrounding wall which merges into the ring, a front wall and a rear wall formed integral therewith, both said walls having openings, a lens in each opening, and a bracket for supporting a lamp in the casing.

6. As an article of manufacture, a structure adapted to replace the rim of a headlight, said structure comprising a ring and a headlight casing formed integral with the ring, said casing comprising a surrounding wall which merges into the ring, a front wall and a rear wall formed integral therewith, said front wall having an opening, a lens over said opening, and a bracket formed integral with a wall of the casing and adapted to support a lamp.

In witness whereof, I have hereunto set my hand this 18th day of February, 1922.

WILLIAM F. DORAN.